(12) United States Patent
Minota

(10) Patent No.: US 6,887,092 B2  
(45) Date of Patent: May 3, 2005

(54) OPTICAL MODULE LOCKING MECHANISM FOR LOCKING OPTICAL MODULE CASE AND CAGE FOR HOUSING CASE TO EACH OTHER

(75) Inventor: Yuji Minota, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/715,528

(22) Filed: Nov. 19, 2003

(65) Prior Publication Data

US 2004/0132327 A1 Jul. 8, 2004

(30) Foreign Application Priority Data

Nov. 19, 2002 (JP) ........................................ 2002-334967

(51) Int. Cl.⁷ .............................................. H01R 13/64
(52) U.S. Cl. ...................................... 439/372; 439/160
(58) Field of Search .............................. 439/160, 630, 439/638, 157, 372, 352; 385/53, 92

(56) References Cited

U.S. PATENT DOCUMENTS 5,964,611 A * 10/1999 Jacob et al. ................. 439/372  
6,381,146 B1 * 4/2002 Sevier ......................... 361/754  
6,533,603 B1 * 3/2003 Togami ....................... 439/372

FOREIGN PATENT DOCUMENTS

| DE | 695 19 642 T 2 | 5/2001 |
|----|----|----|
| JP | U 62-89784 | 6/1987 |
| JP | U 2-146768 | 12/1990 |
| JP | 6-119951 | 4/1994 |
| JP | 8-83645 | 3/1996 |
| JP | 8-222873 | 8/1996 |

* cited by examiner

Primary Examiner—Alex Gilman  
(74) Attorney, Agent, or Firm—Young & Thompson

(57) ABSTRACT

An optical module locking mechanism has locking means for locking a locking member swingably arranged in a case which forms part of an optical module and a cage for housing the case to each other, and a lever pivotably arranged on the case and capable of moving the locking member to release a locking state of the locking means. The locking means is released from the locking state by pulling the lever in a direction in which the optical module housed in the cage is drawn out of the cage. According to this optical module locking mechanism, the locking means can be released from the locking state by pulling the lever in the direction in which the optical module housed in the cage is drawn out of the cage, and the optical module can be removed from the cage by subsequently continuing to pull the lever in the same manner.

20 Claims, 9 Drawing Sheets

OPTICAL MODULE LOCKING MECHANISM FOR LOCKING OPTICAL MODULE CASE AND CAGE FOR HOUSING CASE TO EACH OTHER

BACKGROUND OF THE INVENTION

1. Field of the Invention

The present invention relates to a locking mechanism for an optical module used for making optical signal communications. More specifically, the present invention relates to a locking mechanism for fixing an optical module for use in any of transmission, reception and transmission/reception of optical signals to a cage for housing the optical module.

2. Description of the Related Art

Conventionally, there is known, as an optical module for use in making optical communications, an optical transceiver which comprises a light emitting element and a light receiving element for performing an photo-electric conversion in order to make communications through optical fibers.

One type of such optical transceivers has a case which contains an optical unit including a light emitting element and a light receiving element, and is designed to be removably housed in a cage mounted on a board. An electric connector connected to the board is disposed within the case, such that when the optical transceiver is housed in the case, a connection terminal of the optical transceiver is connected to the electric connector. The optical transceiver thus configured provides for the optical communication through the conversion of optical signals communicated through optical fibers to electric signals communicated between boards, and vice versa.

However, in the optical transceiver configured as mentioned above, the optical transceiver is fixed to the case with the connection terminal of the optical transceiver connected to the electric connector within the cage, but with a fixing strength not so high. Therefore, the optical transceiver is pulled out of the case when even a slight tension is applied, for example, to an optical fiber connected to the optical transceiver. If the optical transceiver is pulled out of the case during its operation, this can cause not only the interruption of a communication in the middle but also a failure of a communication device including the optical transceiver. For this reason, the optical transceiver must be firmly fixed in the cage.

For fixing the transceiver in the cage, a locking mechanism may be used for maintaining the optical transceiver fixed in the cage. Various types of such locking mechanisms have been conventionally proposed and can be used for the purpose of fixing the transceiver in the cage, and one of such locking mechanisms available for this purpose is described in Japanese patent Laid-open Publication No. 119951/94.

FIG. 1 is a perspective view illustrating a conventional connector locking mechanism described in Japanese patent Laid-open Publication No. 119951/94.

The illustrated conventional connector locking mechanism comprises male connector A made of synthetic resin; female connector B likewise made of synthetic resin; and engaging drive lever C swingably mounted on female connector B through supporting shafts 201. Engaging drive lever C is formed with cam grooves 202, and has operating part 203 which comprises lock engaging piece 204 which in turn comprises locking protrusion 204c having tapered engaging guide surface 204a and engaging surface 204b.

When the foregoing locking mechanism is applied to an optical transceiver, male connector A corresponds to the optical transceiver (case), and female connector B corresponds to the cage. In this event, therefore, lever C is provided on the cage side.

Driven pins 205 protrude on both side walls of male connector A, and lock 207 substantially in an L-shape is disposed in recess 206 on the outer wall of connector A. In recess 206, lock 207 has flexible lock plate 207a in an upright posture which has lock releasing part 207b extending from an upper end thereof toward the rear of male connector A. Flexible lock plate 207a is formed with locking hole 207c, and excessive displacement preventing stoppers 207d are disposed behind flexible lock plate 207a.

A front end portion of female connector B is formed into a hood for receiving male connector A, and pin guide grooves 208 are formed on both inner surfaces of the hood for receiving driven pins 205. These pin guide grooves 208 are in alignment with inlets 202a of cam grooves 202 formed in engaging drive lever C when the latter is not operated (in the upright posture).

For connecting male connector A and female connector B to each other, driven pins 205 of male connector A are first moved through pin guide grooves 208 into cam grooves 202, respectively. Under this condition, engaging drive lever C is turned by using operating part 203 to pull male connector A into the hood of female connector B through cam grooves 202 and driven pins 205. Then, as engaging drive lever C is fully turned in this state, locking protrusion 204 is brought into engagement with lock 207.

Lock engaging piece 204 is engaged with lock 207 as a result of the following sequence. Locking protrusion 204c of lock engaging piece 204 abuts against flexible lock plate 207a of lock 207 with the aid of tapered engaging guide surface 204a to displace flexible locking plate 207a backward, while introducing into locking hole 207c, and engagement surface 204b is locked to locking hole 207c of restored flexible lock plate 207a.

The optical transceiver can be firmly fixed in the cage when the locking mechanism as described above is used in the optical transceiver.

However, when the locking mechanism described above is used in the optical transceiver, the optical transceiver must be attached to the cage through two operations which involve inserting the optical transceiver into the cage, and pulling down lever C to bring lock engaging piece 204 into engagement with lock 207. On the other hand, the optical transceiver must be removed from the cage through operations which involve pushing lock releasing part 207b to displace flexible lock plate 207a to the rear to disengage locking protrusion 204c from locking hole 207c for releasing the optical transceiver and cage from each other, and returning lever C to the original position indicated in FIG. 1.

As described above, since the foregoing locking mechanism requires a sequence of operations for removing the optical transceiver from the cage, complicated operations are involved in the removal of the optical transceiver. Particularly, when a communication device has a multiplicity of optical transceivers, the operations become more complicated.

In recent years, a reduction in size and a higher mounting density have been increasingly promoted for most of devices including communication devices. Accordingly, like reduction in size and higher mounting density have been also implemented in optical modules such as optical transceivers disposed in the communication devices.

For mounting a plurality of optical transceivers within a communication device at a high density, the plurality of optical transceivers must be arranged adjacent to each other both in the horizontal and vertical directions. However, when the optical transceiver comprises the aforementioned locking mechanism, a space must be ensured for moving operating part 203 of lever C between positions above and in front of the cage. Consequently, the plurality of cages cannot be arranged adjacent to each other in the vertical direction, thus failing to mount a plurality of optical transceivers within a communication device at a high density.

SUMMARY OF THE INVENTION

It is an object of the present invention to provide an optical module locking mechanism which is capable of removing an optical module from a cage through simple operations, and permits a plurality of optical modules to be mounted within a communication device at a high density.

According to one aspect of the present invention, an optical module locking mechanism includes locking means for locking a locking member swingably arranged in a case which forms part of an optical module and a cage for housing the case to each other, a lever pivotably arranged on the case and capable of moving the locking member to release a locking state of the locking means, and urging means for urging the locking member to bring the locking means into the locking state when the case is housed in the cage, wherein the locking means is released from the locking state by pulling the lever in a direction in which the optical module housed in the cage is drawn out of the cage.

In the optical module locking mechanism according to the present invention, the urging member urges the locking member to bring the locking means into the locking state when the case is housed in the cage, so that the case and cage are locked to each other. Then, as the lever is pulled in the direction in which the optical module housed in the cage is drawn out of the cage, the locking means can be released from the locking state. Then, the optical module can be removed from the cage by subsequently continuing to pull the lever in the same manner. Thus, the optical module locking mechanism according to the present invention can implement both of the operation for releasing the locking means from the locking state, and the operation for removing the optical module from the cage through a simple action of pulling the lever in front of the optical module, thereby making it possible to simplify the operation for removing the optical module from the cage.

The locking means may include an locking hole formed through the cage, and an locking protrusion formed on the locking member for insertion into the locking hole.

The direction in which the optical module housed in the cage is drawn out of the cage is in front of a front end surface of the case, and the lever may be movable over an extent which is within a region in front of the front end surface of the case. Further, the extent over which the lever is movable may be defined within a region between an extension of a topmost surface of the case in front of the front end surface of the case and an extension of a lowermost surface of the case in front of the front end surface of the case.

When the movable extent of the lever exceeds the region in front of the front end surface of the case, a plurality of optical modules, when mounted in a device, must be arranged at wider intervals in consideration of the movable extent of the lever, so that the optical modules cannot be mounted at a high density. However, when the movable extent of the lever is limited to the above-mentioned region in front of the case, it is not necessary to take into consideration the movable extent of the lever when the optical modules are mounted, so that the optical modules can be arranged at narrower intervals, thus making it possible to mount a plurality of optical modules in a device at a higher density.

Further, the case may include a stopper for locking the lever at a predetermined position relative to the case, wherein the lever is brought to a position projecting in front of the front end surface of the case when the lever is released from the lock by the stopper. In this way, after the lever is unlocked from the stopper, the lever is automatically brought to a position at which the operator can readily grasp the lever for drawing out the optical module. Also, even if fingers grasping the lever come off the lever while the operator is drawing out the optical module, the lever is maintained projecting in front of the case, so that the operator can promptly grasp the lever again.

The lever may be arranged for pivotal movement about a pivotal shaft supported in a first groove formed in the case, and the locking member may be arranged to swing about a shaft supported in a second groove formed in the case. The locking member may include a front section disposed on the front side of the case from the shaft and pushed by the lever, and a rear section disposed on the back side of the case from the shaft and having the locking protrusion.

According to the foregoing structure, as the lever is moved to push the front section of the locking member, the rear section of the locking member moves about the shaft in the direction opposite to the direction in which the front section is pushed, whereby the locking protrusion of the rear section can be removed from the locking hole of the cage.

Further, the locking member may include shoulders on the front section against which the lever abuts when the lever projects in front of the case. With this additional feature, the shoulders can be pushed by the lever to push the front section of the locking member.

The urging means may include a spring portion for urging the rear section of the locking member to bring the locking protrusion to a position at which the locking protrusion is fitted into the locking hole. In this way, the rear section is automatically brought to a position at which the locking protrusion is fitted into the locking hole when the lever is not manipulated, so that the locking means can be maintained in the locking state.

The first groove may be formed such that the pivotal shaft can be moved between a first position at which the pivotal shaft is situated when the locking protrusion is fitted in the locking hole and a second position at which the pivotal shaft is situated when the lever is pulled in front of the case, and the locking member may include a cam face formed in its front section such that the pivotal shaft pushes the front section as the pivotal shaft is moved from the first position to the second position within the first groove.

According to the structure described above, as the lever is pulled in front of the case to move the pivotal shaft from the first position to the second position within the first groove, the pivotal shaft pushes the front section of the locking member along the cam face. Consequently, the rear section of the locking member moves as mentioned above, causing the locking protrusion on the rear section to come off the locking hole of the cage. Thus, the foregoing structure enables both the operation for releasing the locking state of the locking member and the operation for removing the optical module from the cage only through the action of pulling the lever in front of the case, thereby further simplifying the operation for removing the optical module from the cage.

Further, the case may include a connection port in the front end surface thereof for connection to a connector to which a cable is connected, and the lever may exclude a portion which would interfere with the cable extending from the connector connected to the connection port when the lever is manipulated. With this additional feature, even if the lever is made movable within a region in front of the case, the lever will not be interfered by a cable when it is connected to the optical module.

In addition, the lever may abut against the connector as the optical module is moved in a direction in which the optical module is drawn out of the cage when the connector is in connection to the connection port, so that the lever is prevented from moving to a position at which the locking means is released from the locking state.

With the foregoing structure, while the connector is in connection to the connection port of the case, the lever will not be inadvertently manipulated to release the locking means from the locking state. It is therefore possible to obviate the removal of the optical module from the cage by mistake in the middle of a communication made through the connector connected to the connection port, thus preventing a communication from being interrupted halfway or the optical module from failing.

The above and other objects, features and advantages of the present invention will become apparent from the following description with reference to the accompanying drawings which illustrate examples of the present invention.

DESCRIPTION OF THE PREFERRED EMBODIMENTS

Figure 1:
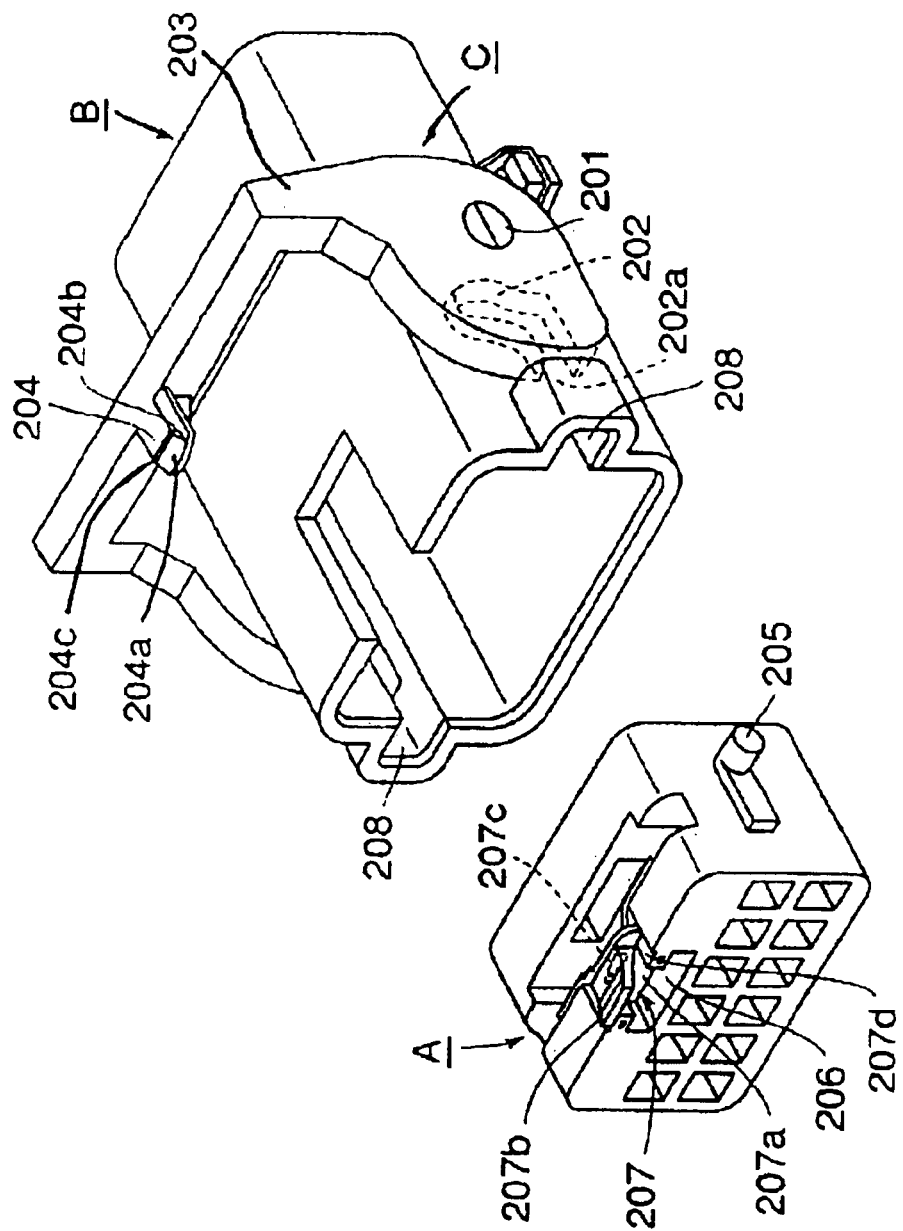
FIG. 1 is a perspective view illustrating a conventional connector locking mechanism.
Figure 2A:
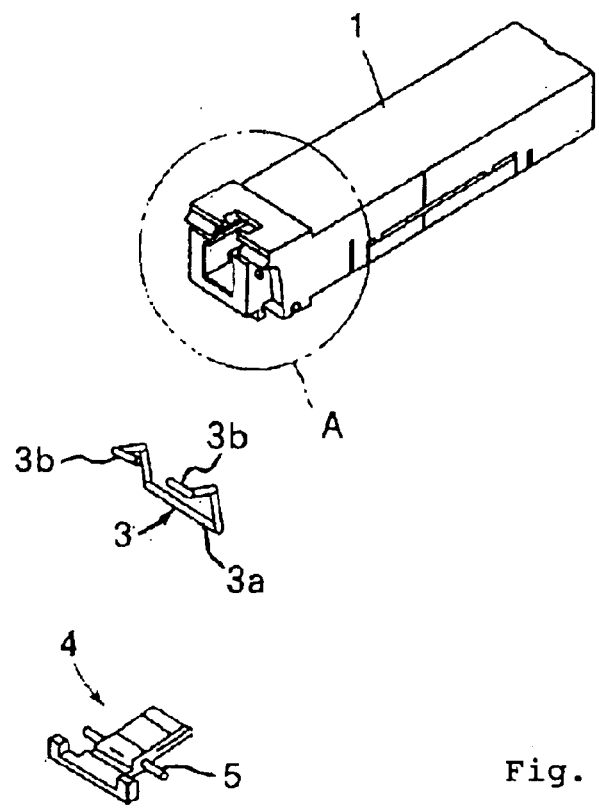
FIGS. 2A and 2B are diagrams illustrating one embodiment of an optical module locking mechanism according to the present invention.
Figure 2B:
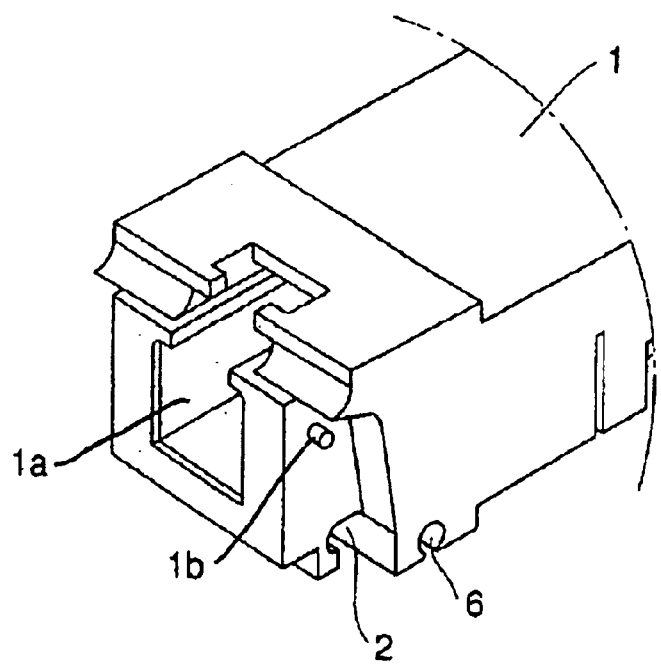
Figure 3:
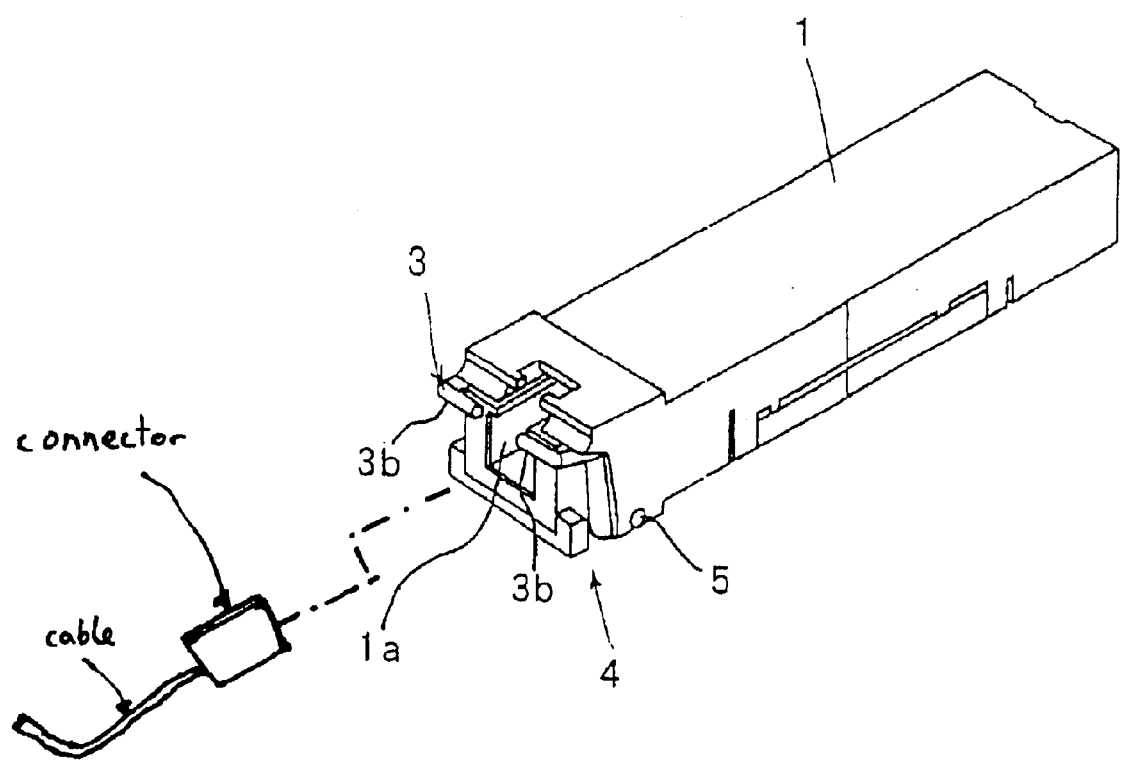
FIG. 3 is a perspective view of the optical module locking mechanism illustrated in FIGS. 2A and 2B when the locking mechanism is assembled.

FIGS. 2A and 2B are diagrams illustrating one embodiment of an optical module locking mechanism according to the present invention, wherein FIG. 2A is a perspective view illustrating the locking mechanism when it is disassembled, and FIG. 2B is an enlarge view of a portion A of a case shown in FIG. 2A. FIG. 3 in turn is a perspective view of the optical module locking mechanism illustrated in FIGS. 2A and 2B when it is assembled.

As illustrated in FIG. 2A, the optical module locking mechanism according to the present invention is made up of case 1 which defines an optical module; and lever 3 and locking member 4 which are attached near a front portion of case 1. Case 1 contains an optical unit which includes a light emitting element and a light receiving element such as LD (laser diode) and PD (photo diode). Case 1 is provided with a connection terminal on its rear end surface for connection to an electric connector within cage 10 (see, for example, FIG. 4), later described, when case 1 is housed in cage 10.

It should be noted that the optical module of this embodiment is for use in any of transmission, reception, and transmission/reception of optical signals, and has at least one of the light emitting element and light receiving element as mentioned above.

As illustrated in FIG. 2B, case 1 is provided with two grooves 2, 6 formed in a front portion thereof. Out of these grooves, pivotal shaft 3a of lever 3 is fitted into cutout groove 2, while supporting shaft 5 of locking member 4 is fitted into groove 6. These lever 3 and locking member 4 are attached to case 1 as illustrated in FIG. 3 by first fitting pivotal shaft 3a of lever 3 into cutout groove 2 which is a first groove, and then fitting supporting shaft 5 of locking member 4 into groove 6, which is a second groove, such that pivotal shaft 3a of lever 3 is sandwiched between case 1 and locking member 4. The resulting structure allows lever 3 to pivot about pivotal shaft 3a supported in cutout groove 2, and locking member 4 to swing about supporting shaft 5 supported in groove 6.

Also, lever stoppers 1b are formed on both side surfaces in a front portion of case 1 as stoppers. When both side portions of lever 3 are locked to lever stoppers 1b, lever 3 can be fixed at a predetermined position of case 1 shown in FIG. 3.

Connection port 1a is open on the front end surface of case 1 for connection to a connector of an optical fiber cable. When the connector of the optical fiber cable is inserted into case 1 through connection port 1a, the connector of the optical fiber cable can be connected to the optical module. Further, as can be seen from FIG. 3, a portion of lever 3 which would interfere with the cable extending from the connector is removed such that the cable will not hinder lever 3 when the optical fiber connector is in connection to connection port 1a.

Figure 4B:
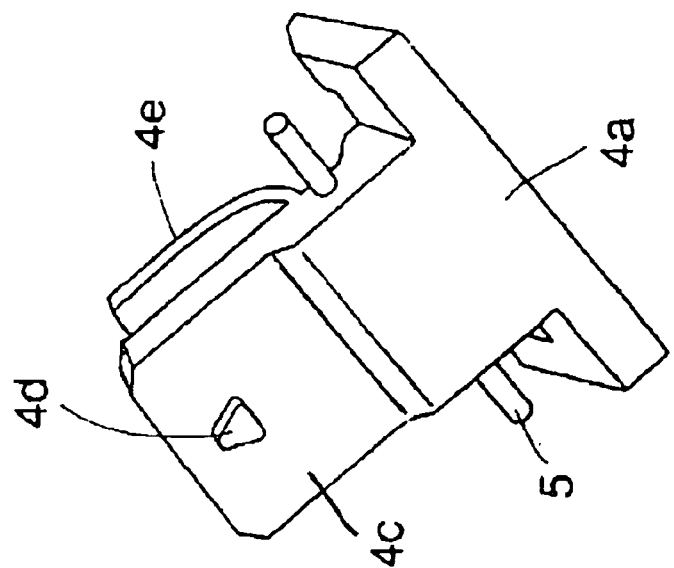
FIGS. 4A and 4B are perspective views illustrating the structure of a lock illustrated in FIG. 2A in detail.
Figure 4A:
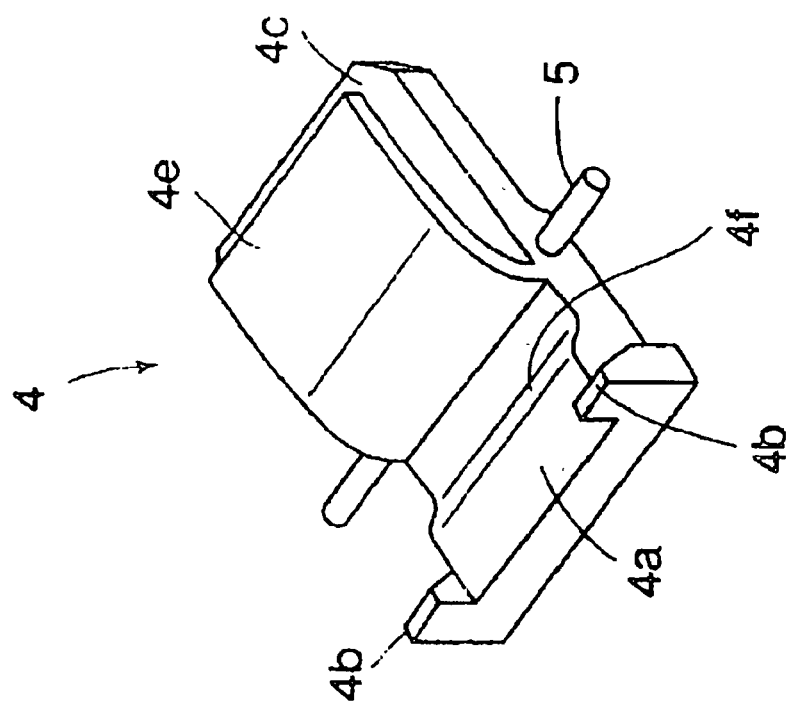

Referring next to FIGS. 4A and 4B, description will be made on the structure of locking member 4 in greater detail. FIG. 4A is a perspective view illustrating the upper side of locking member 4 illustrated in FIG. 2A, and FIG. 4B is a perspective view illustrating the lower side of locking member 4.

Locking member 4 has front section 4a positioned in case 1 in front of supporting shaft 5, and rear section 4c positioned in case 1 behind supporting shaft 5, when locking member 4 is fitted in case 1.

Front section 4a has cam face 4f formed on the top surface thereof, which becomes higher from supporting shaft 5 toward the front end of front section 4a. Front section 4a also has shoulders 4b, formed on both sides of a front end portion, against which both side portions of lever 3 abut when lever 3 is tilted to project in front of case 1.

Above rear section 4c, spring portion 4e as an urging means which has one end fixed substantially in a central portion on the top surface of locking member 4, extends substantially in parallel with the top surface of rear section 4c. Rear section 4c is also provided with protrusive locking piece 4d formed on the bottom surface thereof, which is a locking protrusion fitted into locking hole 10a (see FIG. 5) of cage 10, later described. Locking piece 4d and locking hole 10a constitute a locking means for locking case 1 and cage 10 to each other.

Locking member 4 can be molded integrally with supporting shaft 5. A material suitably used therefor may be a resin such as PPS (polyphenylene sulfide) or the like. Alternatively, portions of locking member 4 other than spring portion 4e may be integrally molded with a resin as mentioned above, and spring portion 4e may be later attached to the resulting molding. In the latter case, spring portion 4e may be made of a different material from that of the remaining portions, and for example, spring portion 4e alone may be made of metal.

Figure 5:
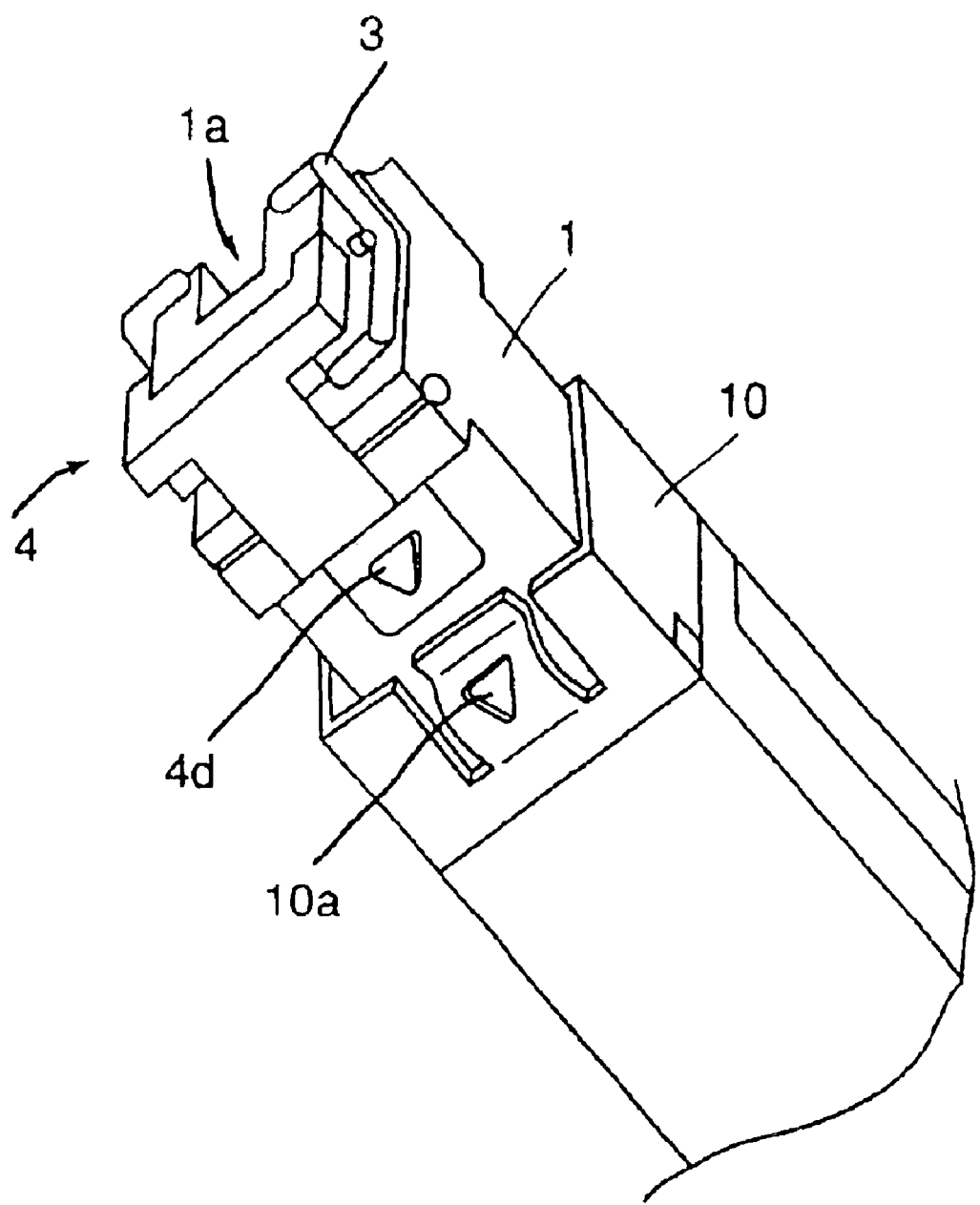
FIG. 5 is a perspective view illustrating from below a case of the optical module illustrated in FIGS. 2A, 2B and the like, when it is inserted into a cage.

FIG. 5 is a perspective view illustrating from below case 1 of the optical module, illustrated in FIGS. 2A, 2B and the like, when it is inserted into cage 10.

Cage 10, which receives case 1 of the optical module, has locking hole 10a formed through the bottom surface thereof. Locking hole 10a is formed at a position at which locking piece 4d of locking member 4 is fitted into locking hole 10a when case 1 is fully inserted into cage 10.

Cage 10 is mounted on a board (not shown), and cage 10 contains an electric connector (not shown) connected to the board. The electric connector is connected to a connector (not shown) disposed on the rear end surface of case 1 when case 1 is completely inserted into cage 10.

Cage 10 may be made by bending a metal sheet made, for example, of stainless steel. Likewise, case 1 may be made by bending a metal sheet made of stainless steel or the like. Alternatively, case 1 may be molded with a resin such as PPS (polyphenylene sulfide) or the like in a manner similar to locking member 4.

As lever 3 is moved in a direction in which the optical module is drawn out of cage 10 when a connector is in connection to connection port 1a, lever 3 abuts against the connector to prevent locking piece 4d fitted in locking hole 10a from moving to a position at which locking piece 4d is removed from locking hole 10a. In this way, while the connector is in connection to connection port 1a, lever 3 will not be inadvertently manipulated to remove locking piece 4d from locking hole 10a. It is therefore possible to obviate the removal of the optical module from cage 10 by mistake in the middle of a communication made through the connector connected to connection port 1a, thus preventing a communication from being interrupted halfway or the optical module from failing.

Figure 6:
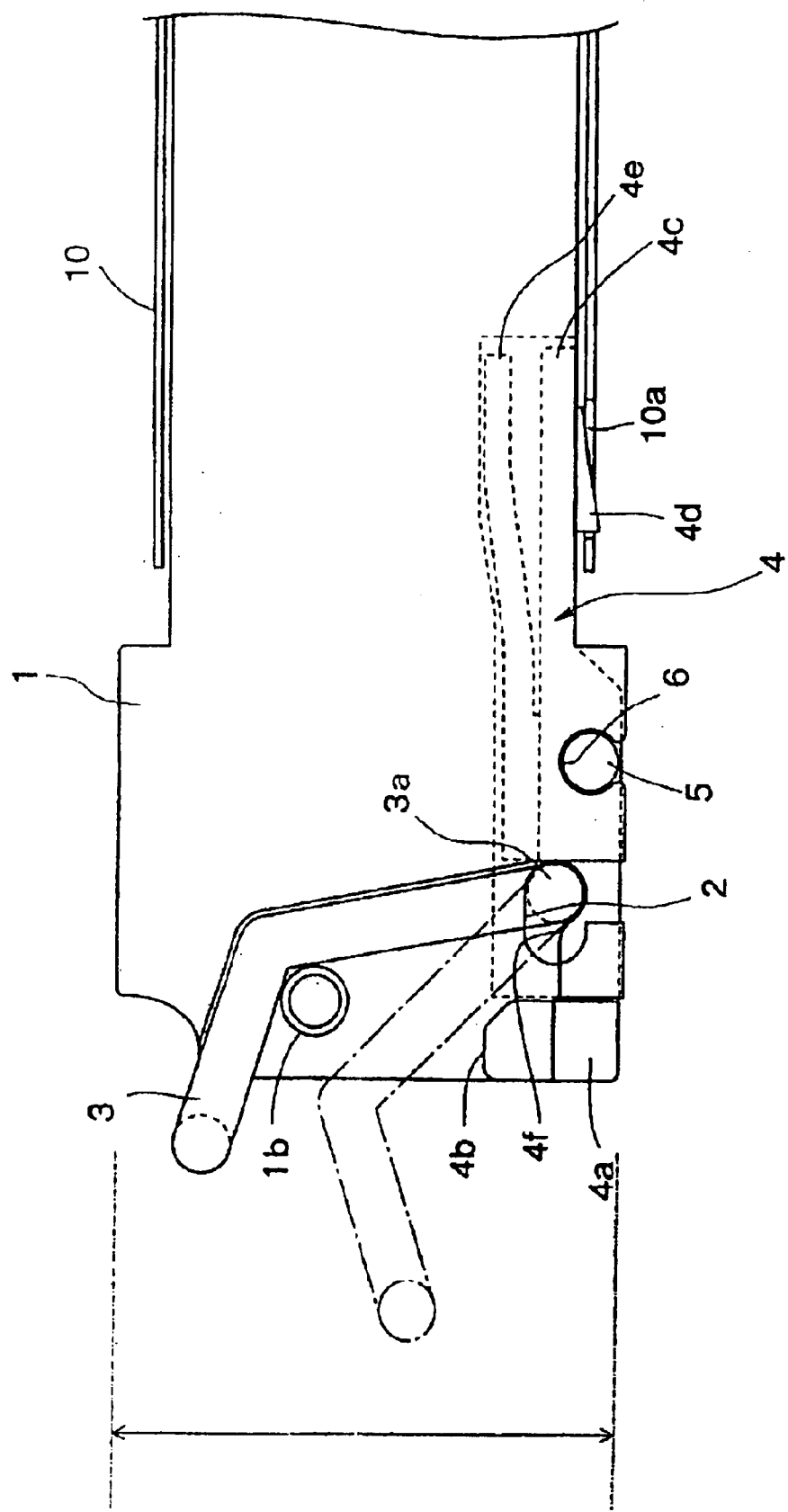
FIG. 6 is a diagram illustrating the optical module locking mechanism when it is locking the optical module and cage to each other.
Figure 7:
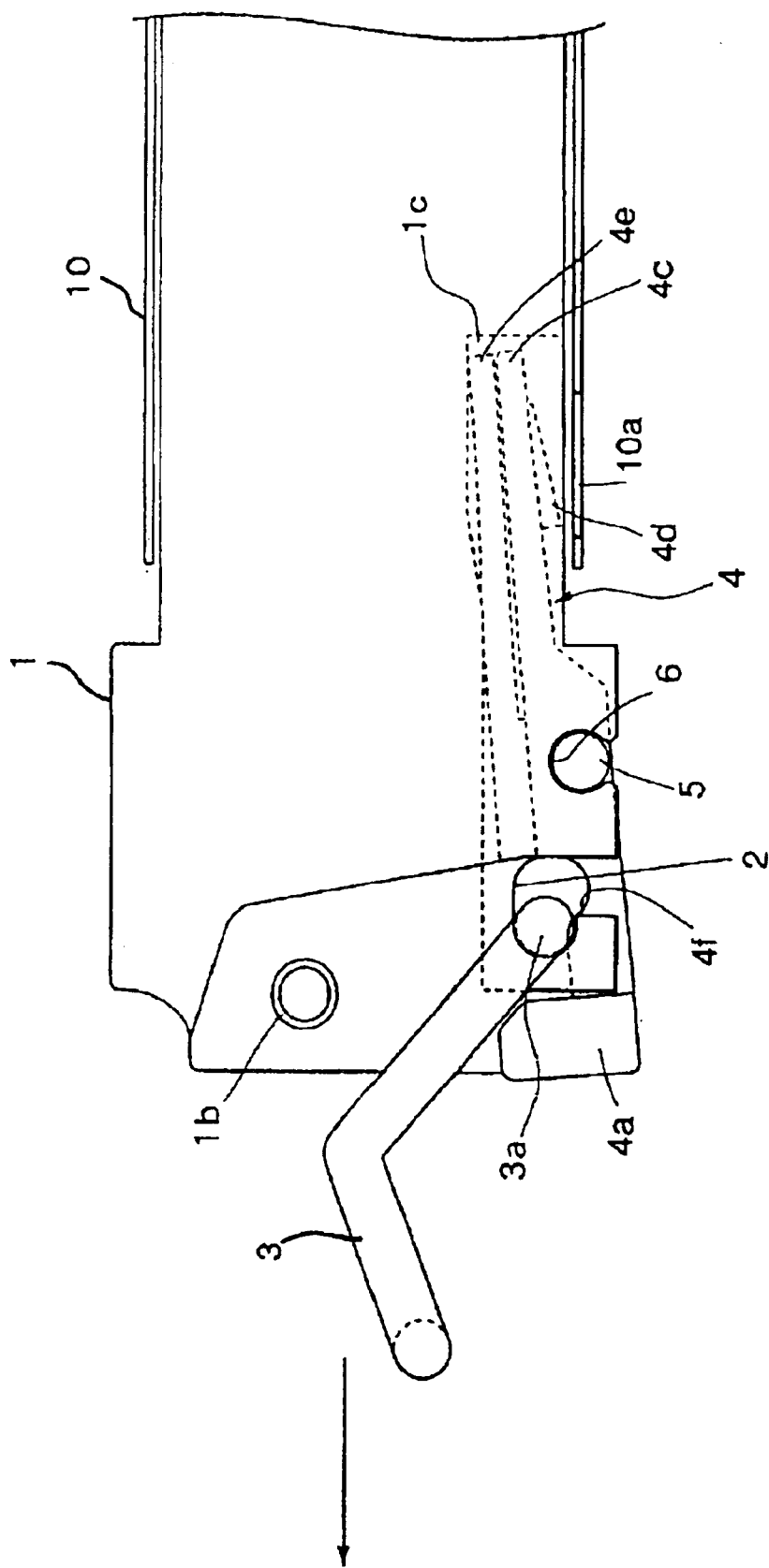
FIG. 7 is a diagram illustrating the optical module locking mechanism when it releases the optical module and cage from each other.

Referring next to FIGS. 6 and 7, description will be made on the operation of the respective components of the optical module locking mechanism described above. FIG. 6 is a diagram illustrating the locking mechanism which locks optical module case 1 and cage 10 to each other, and FIG. 7 is a diagram illustrating the locking mechanism which has released optical module case 1 from cage 10. In FIGS. 6 and 7, locking member 4 is shown through cage 10.

FIG. 6 shows that optical module case 1 is completely inserted in cage 10. In this state, spring portion 4e abuts against concave groove 1c formed on the bottom surface of case 1 to urge rear section 4c of locking member 4, so that locking piece 4d of locking member 4 is fitted into locking hole 10a of cage 10. Thus, the locking mechanism is operative for locking optical module case 1 to cage 10.

When the locking mechanism is locking optical module case 1 to cage 10 as described above, locking member 4 maintains a posture horizontal to case 1. Pivotal shaft 3a of lever 3 is positioned on the rear end side (first position) of cutout groove 2, and stays at the lowest position of cam face 4f formed in the front section 4a of locking member 4.

When lever 3 is tilted to release lever 3 locked by lever stoppers 1b in this state, lever 3 pivots about pivotal shaft 3a positioned on the rear end side of cutout groove 2 to project in front of case 1, as indicated by one-dot chain lines in FIG. 6. In this embodiment, lever 3 is movable between the position indicated by solid lines and the position indicated by the one-dot chain line in FIG. 6. In other words, lever 3 is designed to move only within a region in front of the front end surface of case 1 defined by an extension of the topmost surface of case 1 in front of the front end surface of case 1 and an extension of the lowermost surface of case 1 in front of the front end surface of case 1 (region indicated by a double-headed arrow in FIG. 6)

When the movable range of lever 3 exceeds the above-mentioned region in front of the front end surface of case 1, a plurality of optical modules, when mounted in a device, must be arranged at wider intervals in consideration of the movable range of lever 3, so that the optical modules cannot be mounted in the device at a high density. In contrast, when the movable range of lever 3 is limited to the above-mentioned region in front of case 1, it is not necessary to take into consideration the movable range of lever 3 when optical modules are mounted, and the optical modules can be arranged at narrower intervals, making it possible to mount a plurality of optical modules in a device at a higher density.

Also, lever 3 is brought to a position projecting in front of case 1 when it is released from the lock by lever stoppers 1b. Thus, after lever 3 is unlocked from lever stoppers 1b, lever 3 is automatically placed at a position at which an operator can readily grasp lever 3 for drawing out the optical module. Also, even if fingers grasping lever 3 come off lever 3 while the operator is drawing out the optical module, lever 3 is maintained at a position projecting in front of case 1, so that the operator can promptly grasp lever 3 again.

FIG. 7 illustrates case 1 of the optical module which is being drawn out of cage 10.

Optical module case 1 can be drawn out of cage 10 by grasping and pulling lever 3 in front of case 1 (a direction indicated by an arrow in FIG. 7) after lever 3 is tilted to be released from the lock by lever stoppers 1b. In this event, pivotal shaft 3a of lever 3 moves within cutout groove 2 to a position (second position) at which it abuts against the front end of cutout groove 2.

As pivotal shaft 3a of lever 3 moves to the position at which it abuts against the front end of cutout groove 2, pivotal shaft 3a pushes down cam face 4f formed in the front section 4a of locking member 4. In response, locking member 4 swings about supporting shaft 5 in groove 6, causing spring portion 4e and rear section 4c to move up. Then spring portion 4e abuts against concave groove 1c formed in the bottom surface of case 1 into flexure, and locking piece 4d on the bottom surface of rear section 4c comes off locking hole 10a of cage 10. Consequently, the lock of the locking mechanism is released, as illustrated in FIG. 7.

While the operator is pulling lever 3 in front of case 1, locking member 4 is held inclined as illustrated in FIG. 7, causing the locking mechanism to continuously release the lock of case 1 to cage 10.

On the other hand, when the operator stops pulling lever 3 in front of case 1, rear section 4c of locking member 4 is pushed down by a resilience of spring portion 4e which has been in flexure, and locking member 4 is going to swing about supporting shaft 5 in the direction opposite to the foregoing. In this event, pivotal shaft 3a of lever 3 is pushed back along cam face 4f in cutout groove 2, and eventually abuts against the rear end in cutout groove 2. As pivotal shaft 3a of lever 3 abuts against the rear end in cutout groove 2, locking member 4 returns to the original horizontal position shown in FIG. 6.

As described above, spring portion 4e urges rear section 4c such that locking piece 4d is brought to the position at which it is fitted into locking hole 10a, so that when case 1 is not housed in cage 10, rear section 4c can be automatically placed at the position at which locking piece 4d is fitted into locking hole 10a when lever 3 is not manipulated, thus maintaining the locking mechanism to lock case 1 and cage 10 to each other.

The aforementioned "first position" refers to a position within cutout groove 2 at which pivotal shaft 3a rests when lever 3 is not being pulled in front of case 1, and the "second position" refers to a position within cutout groove 2 to which pivotal shaft 3a is moved when lever 3 is pulled in front of case 1.

Next, description will be made on the operation for releasing the optical module locking mechanism described above.

<First Lock Releasing Operation>

Figure 8A:
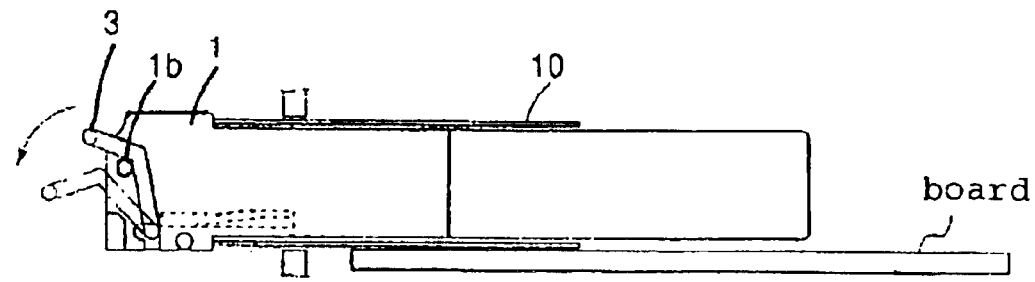
FIGS. 8A to 8C are diagrams for describing a first operation for releasing the optical module locking mechanism.
Figure 8B:
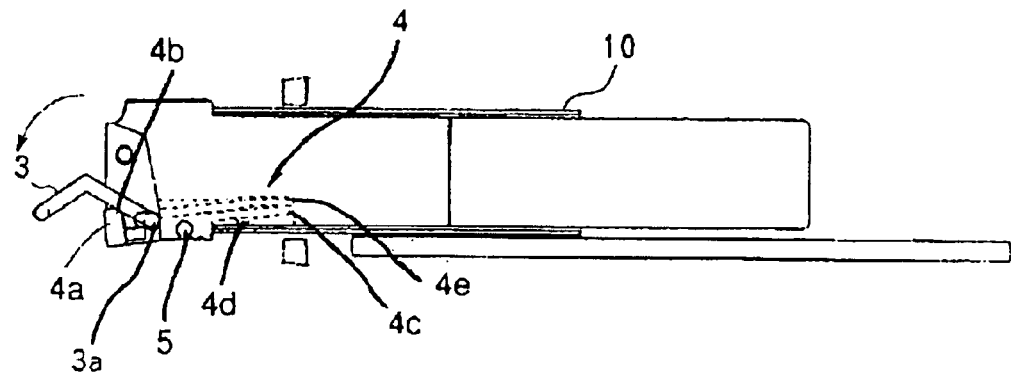
Figure 8C:
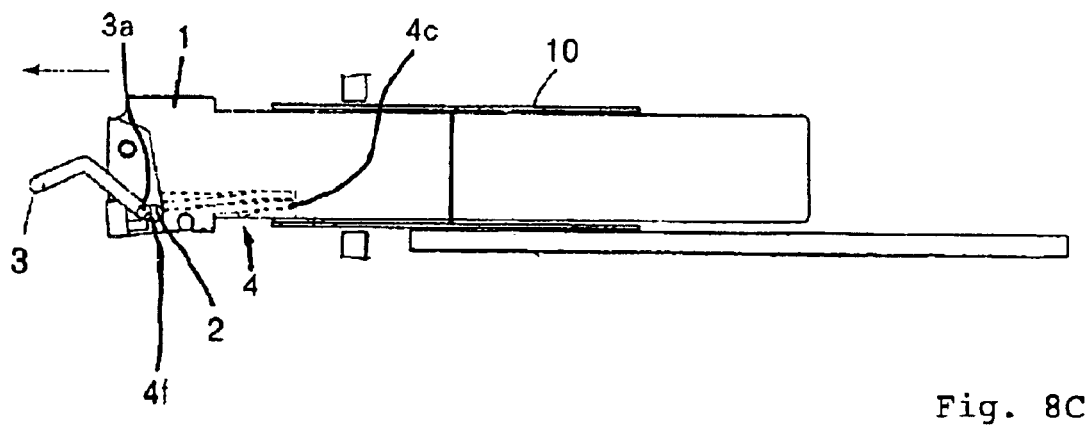

FIGS. 8A to 8C are diagrams for describing a first operation for releasing the optical module locking mechanism.

For releasing the optical module locking mechanism, lever 3 is first tilted in a direction indicated by an arrow in FIG. 8A to release lever 3 locked by lever stopper 1b. As illustrated in FIGS. 2A and 3, lever 3 has part of operating parts 3b removed, so that both side portions of lever 3 are more susceptible to flexure. Therefore, as lever 3 is tilted from a locked position indicated by solid lines in FIG. 8A, both side portions of lever 3 bow to overcome lever stoppers 1b, resulting in lever 3 released from the lock by lever stoppers 1b, as indicated by one-dot chain lines in FIG. 8A.

Subsequently, in the first releasing operation, lever 3 is further tilted in a direction indicated by an arrow in FIG. 8B, with pivotal shaft 3a of lever 3 remaining at the rear end of cutout groove 2, as illustrated in FIG. 8B, to bring both side portions of lever 3 into abutment with shoulders 4b in front section 4a of locking member 4 to push down front section 4a of locking member 4. Consequently, rear section 4c and spring portion 4e of locking member 4 are lifted up about supporting shaft 5. In this event, spring portion 4e abuts against concave groove 1c formed in the bottom surface of case 1 into flexure, causing locking piece 4d of rear section 4c to come off locking hole 10a of cage 10 (see, for example, FIG. 6).

Afterwards, lever 3 is pulled in front of case 1, pivotal shaft 3a of lever 3 moves in front of case 1 within cutout groove 2, and abuts against the front end of cutout groove 2. In this event, both side portions of lever 3 are pushing down shoulders 4b in front section 4a of locking member 4 as mentioned above, or pivotal shaft 3a is pushing down cam face 4f of locking member 4 as mentioned above, so that locking member 4 has rear section 4c still fitted in concave groove 1c in the bottom surface of case 1.

Therefore, for pulling lever 3 in front of case 1 to remove case 1 from cage 10, locking piece 4d of locking member 4 remains lifted up to leave the locking mechanism released from the lock. Thus, the locking mechanism will not lock again while lever 3 is being pulled in front to draw out case 1 from cage 10.

As described above, according to the optical module locking mechanism of this embodiment, a sequence of simple operations involving tilting lever 3 and pulling lever 3 in front of case 1 can implement a sequence of operations from releasing the lock of case 1 to cage 10 to removing case 1 from cage 10. It is therefore possible to simplify the operation for removing case 1 from cage 10.

Also, in this embodiment, since lever 3 works only in the front region of case 1, a plurality of cages 10 can be arranged adjacent to each other both in the horizontal and vertical directions, making it possible to mount a plurality of optical modules in a device at a higher density.

<Second Lock Releasing Operation>

Figure 9A:
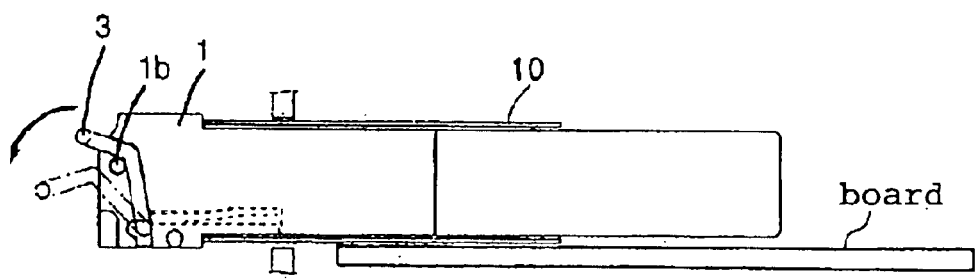
FIGS. 9A to 9C are diagrams for describing a second operation for releasing the optical module locking mechanism.
Figure 9B:
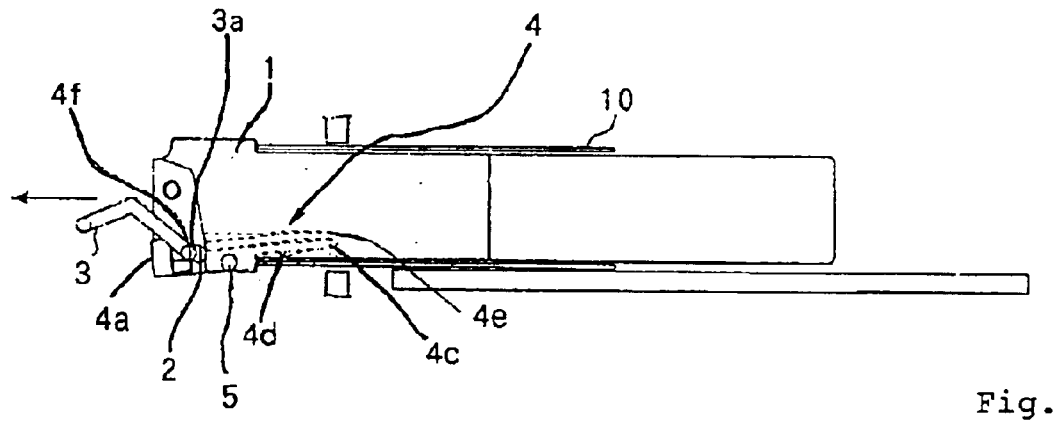
Figure 9C:
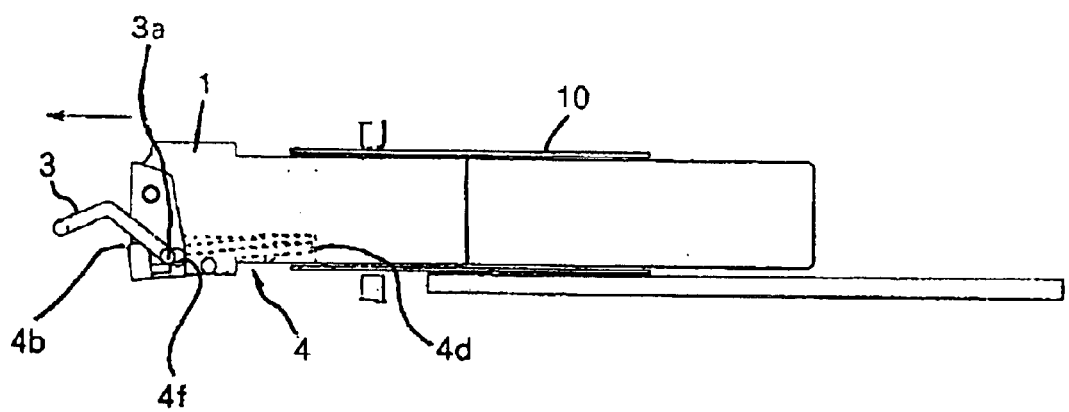

FIGS. 9A to 9C are diagrams for describing a second operation for releasing the optical module locking mechanism.

The second operation is similar to the first operation in that lever 3 is first tilted in a direction indicated by an arrow in FIG. 9A to release lever 3 from the lock by lever stoppers 1b for releasing the optical module locking mechanism.

Next, in the second lock releasing operation, lever 3 is pulled in front of case 1, as illustrated in FIG. 9B, to move pivotal shaft 3a of lever 3 from the rear end (first position) to the front end (second position) within cutout groove 2, until pivotal shaft 3a abuts against the front end of cutout groove 2. Consequently, pivotal shaft 3a of lever 3 pushes down cam face 4f of locking member 4, causing rear section 4c and spring portion 4 of locking member 4 to lift up about supporting shaft 5. In this event, spring portion 4e abuts against concave groove 1c formed in the bottom surface of case 1 into flexure, causing locking piece 4d of rear section 4c to come off locking hole 10a of cage 10 (see, for example, FIG. 6).

Subsequently, as lever 3 is further pulled in front of case 1 as illustrated in FIG. 9C, case 1 can be removed from cage 10. In this event, both side portions of lever 3 are pushing down shoulders 4b in front section 4a of locking member 4, or pivotal shaft 3a is pushing down cam face 4f of locking member 4 as mentioned above, so that locking member 4 has rear section 4c still fitted in the concave recess in the bottom surface of case 1. Thus, while lever 3 is pulled in front to draw out case 1 from cage 10, locking piece 4d of locking member 4 remains lifted up to leave the locking mechanism released from the lock, thereby preventing the locking mechanism from locking again.

As described above, according to the optical module locking mechanism of this embodiment, even a simple action of merely pulling lever 3 in front of case 1 can implement a sequence of operations from releasing the lock of case 1 to cage 10 to removing case 1 from cage 10.

While preferred embodiments of the present invention have been described using specific terms, such description is for illustrative purposes only, and it is to be understood that changes and variations may be made without departing from the spirit or scope of the following claims.

What is claimed is:

1. An optical module locking mechanism for locking a case containing an optical element and a cage for housing said case, said mechanism comprising:

a locking member swingably arranged in said case;

locking means for locking said locking member and said cage to each other; and a lever pivotably arranged on said case, said lever capable of moving said locking member to release a locking state of said locking means, wherein said locking means is released from the locking state by pulling said lever in a direction in which said optical module housed in said cage is drawn out of said cage, wherein said locking means comprises a locking hole formed through said cage, and an locking protrusion formed on said locking member for insertion into said locking hole, wherein said lever is arranged for pivotal movement about a pivotal shaft supported in a first groove formed in said case, and said locking member is arranged to swing about a shaft supported in a second groove formed in said case, wherein said locking member includes a front section disposed on the front side of said case from said shaft and pushed by said lever, and a rear section disposed on the rear side of said case from said shaft and having said locking protrusion, and wherein said locking member includes shoulders on said front section against which said lever abuts when said lever projects in front of said case.

2. The optical module locking mechanism according to claim 1, wherein:

said case includes a stopper for locking said lever at a predetermined position relative to said case, and said lever is brought to a position projecting in front of the front end surface of said case when said lever is released from the lock by said stopper.

3. The optical module locking mechanism according to claim 1, wherein:

said mechanism further comprises urging means for urging said locking member to bring said locking means into the locking state when said case is housed in said cage.

4. The optical module locking mechanism according to claim 3, wherein:

said urging means consists of a spring portion for urging said rear section of said locking member to bring said locking protrusion to a position at which said locking protrusion is fitted into said locking hole.

5. The optical module locking mechanism according to claim 1, wherein:

said direction in which said optical module housed in said cage is drawn out of said cage is in front of a front end surface of said case, and said lever is movable over an extent which is within a region in front of the front end surface of said case.

6. The optical module locking mechanism according to claim 5, wherein:

said extent over which said lever is movable is defined within a region between an extension of a topmost surface of said case in front of the front end surface of said case and an extension of a lowermost surface of said case in front of the front end surface of said case.

7. The optical module locking mechanism according to claim 1, wherein:

said case includes a connection port in its front end surface for connection to a connector to which a cable is connected; and said lever comprises a portion having a gap so that said lever avoids interference with said cable extending from said connector connected to said connection port when said lever is manipulated.

8. The optical module locking mechanism according to claim 7, wherein:

said lever abuts against said connector as said optical module is moved in a direction in which said optical module is drawn out of said cage when said connector is in connection to said connection port, so that said lever is prevented from moving to a position at which said locking means is released from the locking state.

9. An optical module locking mechanism for locking a case containing an optical element and a cage for housing said case, said mechanism comprising:

a locking member swingably arranged in said case;

locking means for locking said locking member and said cage to each other; and a lever pivotably arranged on said case, said lever capable of moving said locking member to release a locking state of said locking means, wherein said locking means is released from the locking state by pulling said lever in a direction in which said optical module housed in said cage is drawn out of said cage, wherein said locking means comprises a locking hole formed through said cage, and an locking protrusion formed on said locking member for insertion into said locking hole, wherein said lever is arranged for pivotal movement about a pivotal shaft supported in a first groove formed in said case, and said locking member is arranged to swing about a shaft supported in a second groove formed in said case, wherein said locking member includes a front section disposed on the front side of said case from said shaft and pushed by said lever, and a rear section disposed on the rear side of said case from said shaft and having said locking protrusion, wherein said first groove is formed such that said pivotal shaft is movable between a first position at which said pivotal shaft is situated when said locking protrusion is fitted in said locking hole and a second position at which said pivotal shaft is situated when said lever is pulled in front of said case; and wherein said locking member includes a cain face formed in said front section such that said pivotal shaft pushes said front section as said pivotal shaft is moved from said first position to said second position within said first groove.

10. The optical module locking mechanism according to claim 9, wherein:

said case includes a stopper for locking said lever at a predetermined position relative to said case, and said lever is brought to a position projecting in front of the front end surface of said case when said lever is released from the lock by said stopper.

11. The optical module locking mechanism according to claim 9, wherein:

said mechanism further comprises urging means for urging said locking member to bring said locking means into the locking state when said case is housed in said cage.

12. The optical module locking mechanism according to claim 11, wherein:

said urging means consists of a spring portion for urging said rear section of said locking member to bring said locking protrusion to a position at which said locking protrusion is fitted into said locking hole.

13. The optical module locking mechanism according to claim 9, wherein:

said direction in which said optical module housed in said cage is drawn out of said cage is in front of a front end surface of said case, and said lever is movable over an extent which is within a region in front of the front end surface of said case.

14. The optical module locking mechanism according to claim 13, wherein:

said extent over which said lever is movable is defined within a region between an extension of a topmost surface of said case in front of the front end surface of said case and an extension of a lowermost surface of said case in front of the front end surface of said case.

15. The optical module locking mechanism according to claim 9, wherein:

said case includes a connection port in its front end surface for connection to a connector to which a cable is connected; and said lever comprises a portion having a gap so that said lever avoids interference with said cable extending from said connector connected to said connection port when said lever is manipulated.

16. The optical module locking mechanism according to claim 15, wherein:

said lever abuts against said connector as said optical module is moved in a direction in which said optical module is drawn out of said cage when said connector is in connection to said connection port, so that said lever is prevented from moving to a position at which said locking means is released from the locking state.

17. An optical module locking mechanism for locking a case containing an optical element and a cage for housing said case, said mechanism comprising:

a locking member swingably arranged in said case;

a locking hole formed in said cage;

a locking protrusion formed on said locking member for insertion into said locking hole, and a lever pivotally arranged on said case that releases said locking state of said locking hole and said locking protrusion, wherein said lever is arranged for pivotal movement about a pivotal shaft supported in a first groove formed in said case, and said locking member is arranged to swing about a shaft supported in a second groove formed in said case, wherein said locking member includes a front section disposed on the front side of said case from said shaft and pushed by said lever, and a rear section disposed on the rear side of said case from said shaft and having said locking protrusions, and wherein said locking member includes shoulders on said front section against which said lever abuts when said lever projects in front of said case.

18. An optical module locking mechanism according to claim 17, further comprising a resilient member for urging said locking member to bring said locking hole and said locking protrusion into the locking state when said case is housed in said cage.

19. An optical module locking mechanism for locking a case containing an optical element and a cage for housing said case, said mechanism comprising:

a locking member swingably arranged in said case;

a locking hole formed in said cage;

a locking protrusion formed on said locking member for insertion into said locking hole; and a lever pivotally arranged on said case that releases said locking state of said locking hole and said locking protrusion, wherein said lever is movable between a first position such that said locking protrusion is fitted in said locking hole and a second position such that said locking protrusion is outside said locking hole; and wherein said locking member includes a cam face such that said lever urges against said locking member when aid lever is moved from said first position to said second position.

20. An optical module locking mechanism according to claim 19, further comprising a resilient member for urging said locking member to bring said locking hole and said locking protrusion into the locking state when said case is housed in said cage.

* * * * *